US00H002175H

(19) United States
(12) Statutory Invention Registration
Touchstone

(10) Reg. No.: US H2175 H
(43) Published: Nov. 7, 2006

(54) AIRCRAFT WHEEL AND TIRE COMPRESSOR

(75) Inventor: Kelly Touchstone, Rosamond, CA (US)

(73) Assignee: The United States of America as represented by the Secretary of the Air Force, Washington, DC (US)

(21) Appl. No.: 10/739,697

(22) Filed: Dec. 19, 2003

(51) Int. Cl.
*B60C 25/132* (2006.01)

(52) U.S. Cl. ..... 157/1.17; 157/1.2; 157/1.24; 157/1.28; 157/1.33; 157/1.1; 157/1.39

(58) Field of Classification Search ..... 157/1.17, 157/1.2, 1.24, 1.28, 1.33, 1.1, 1.39
See application file for complete search history.

(56) References Cited

U.S. PATENT DOCUMENTS 2,171,282 A * 8/1939 Wochner ..... 269/47
2,471,642 A * 5/1949 Moltz ..... 157/18
2,545,157 A * 3/1951 McCrary ..... 157/1.2
2,566,315 A * 9/1951 Christofoli ..... 157/1.2
3,211,206 A * 10/1965 Conrad ..... 157/1.24
4,800,942 A * 1/1989 Timlin ..... 157/1.24

* cited by examiner

*Primary Examiner*—M. Clement
(74) *Attorney, Agent, or Firm*—William G. Auton

(57) ABSTRACT

This new wheel compressor has a spring loaded, shaft with a foot operated torque brace, that when stepped on moves the shaft down. The shaft has an ACME threaded collar welded to the inside that has an ACME bolt threaded T-bar that has a compressor wing that when inserted through the center axel of the wheel threaded to the shaft compresses the wheel.

3 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIRCRAFT WHEEL AND TIRE COMPRESSOR

STATEMENT OF GOVERNMENT INTEREST

The invention described herein may be manufactured and used by or for the Government for governmental purposes without the payment of any royalty thereon.

BACKGROUND OF THE INVENTION

The present invention related generally to aircraft and more specifically to an improved aircraft wheel and tire compressor system. Air Force military aircraft have their tires serviced in accordance with USAF Technical Orders 4T-1-3 the disclosure of which is incorporated by reference.

Previously our aircraft wheel and tire assemblies were compressed by stepping on the wheel assembly, while placed on boards, or on top of workbench. Another method that was used was placing the wheel and tire assembly between two large pieces of wood in the bead breaker compressing the assembly by drawing the rings together and inserting the nuts and bolts.

Before the compressor was implemented, O-rings were pinched causing air leaks resulting in having to take the assembly apart to repair. The tie bolts would not always come completely through the tie bolt holes and the individual standing on the wheel assembly would have to shift weight forward to the person installing the nut and bolt, or bounce up and down to insert a nut on the bolt. Quite often, trying to insert the nut to the bolt would result in having to aim the nut to the bold before the bolt receded back into the hole. Placing the wheel and tire assembly into the bead breaker on small wheels would require balancing the tire assembly on your knee between two boards and than compressing, often the bolts would catch on the other half and push back out (gravity angle), you would than have to push bolts back in and then install nuts. You're finger manipulation area was smaller and the assemblies very limited.

SUMMARY OF THE INVENTION

The present invention includes a modification to a military aircraft wheel assembly fixture used on servicing tires of F-16, T-38, F-15 and similar aircraft. In operation the wheel compressor has a spring loaded, shaft with a foot operated torque brace, that when stepped on moves the shaft down. The shaft has an ACME threaded collar welded to the inside that has a ACME bolt threaded T-bar that has a compressor wing that when inserted through the center axel of the wheel assembly threaded to the shaft compresses the wheel. The invention was tested on a F-16 main, T-38 main, F-16 Nose, and an Fl-15 Nose. We found that the compressor tool worked extremely well and that a job that took normally 2 people was reduced down to one person, also to unsafe procedures need be implemented, and no carrying the assembly from one area to another just to insert bolts.

DETAILED DESCRIPTION OF THE PREFERRED EMBODIMENT

The present invention includes an improved aircraft wheel and tire compressor system for use in servicing aircraft tires.

Figure 1:
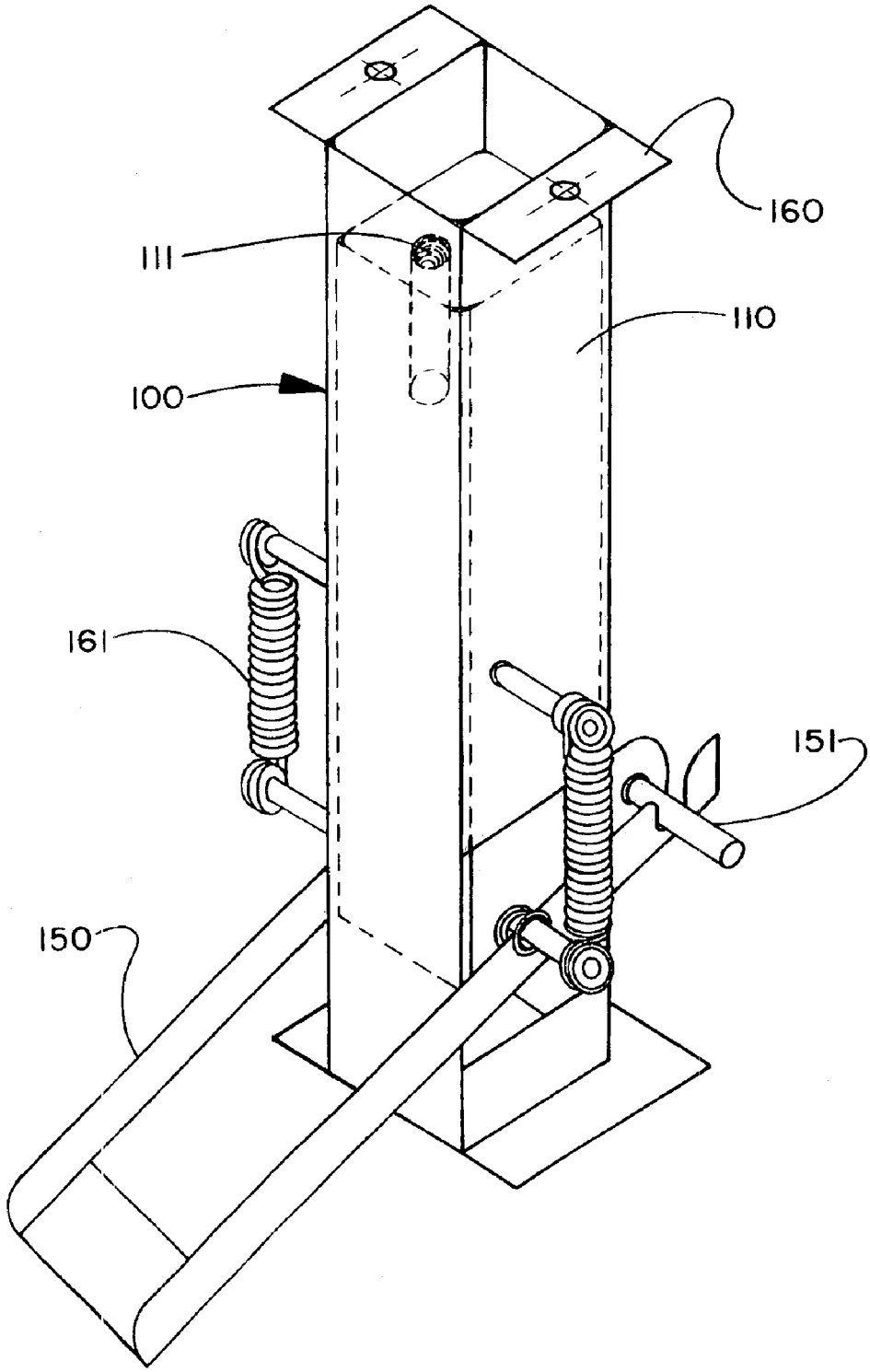
FIGS. 1–3 illustrate the major elements of the tire compressor system of the present invention.
Figure 2:
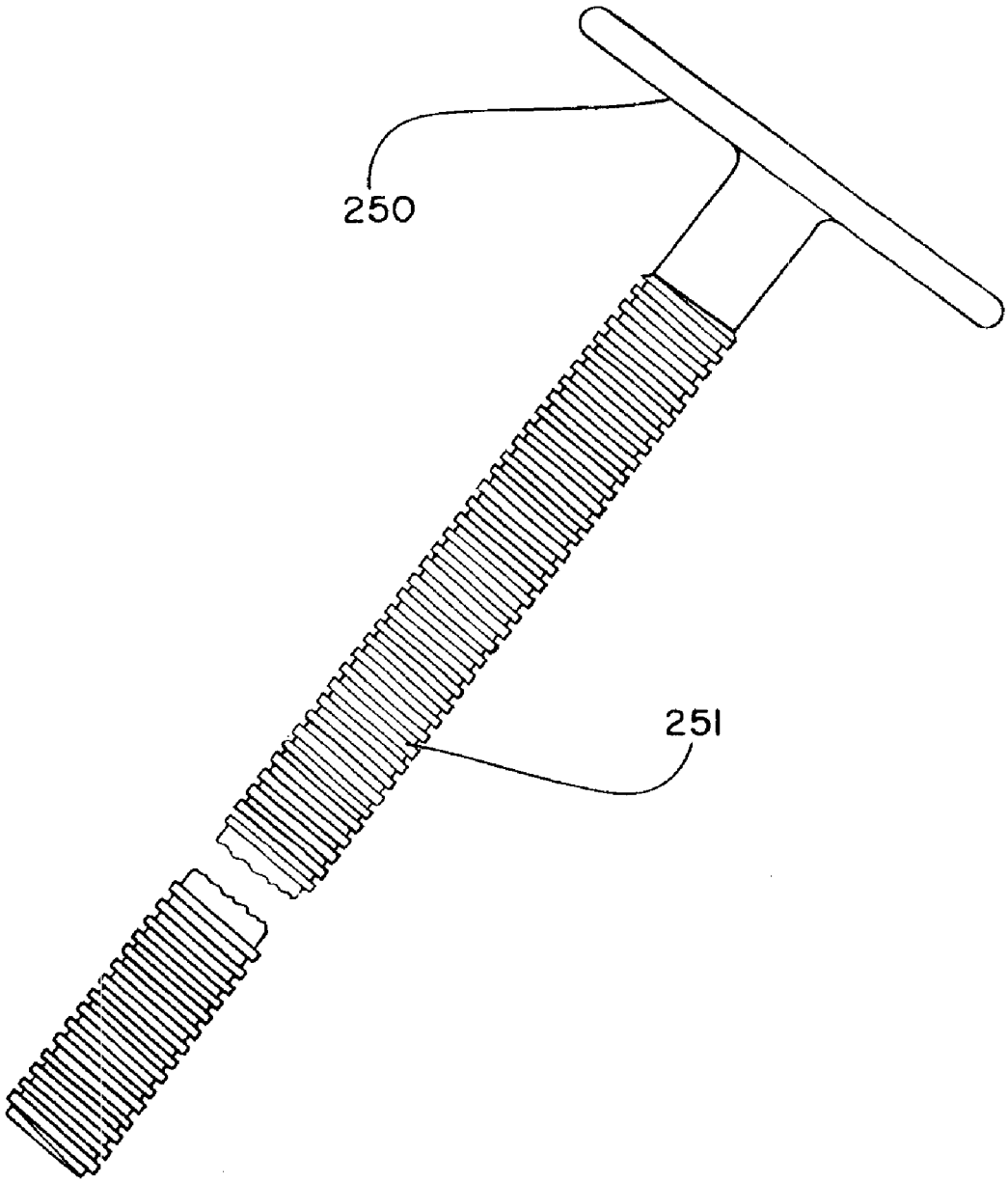
Figure 3:
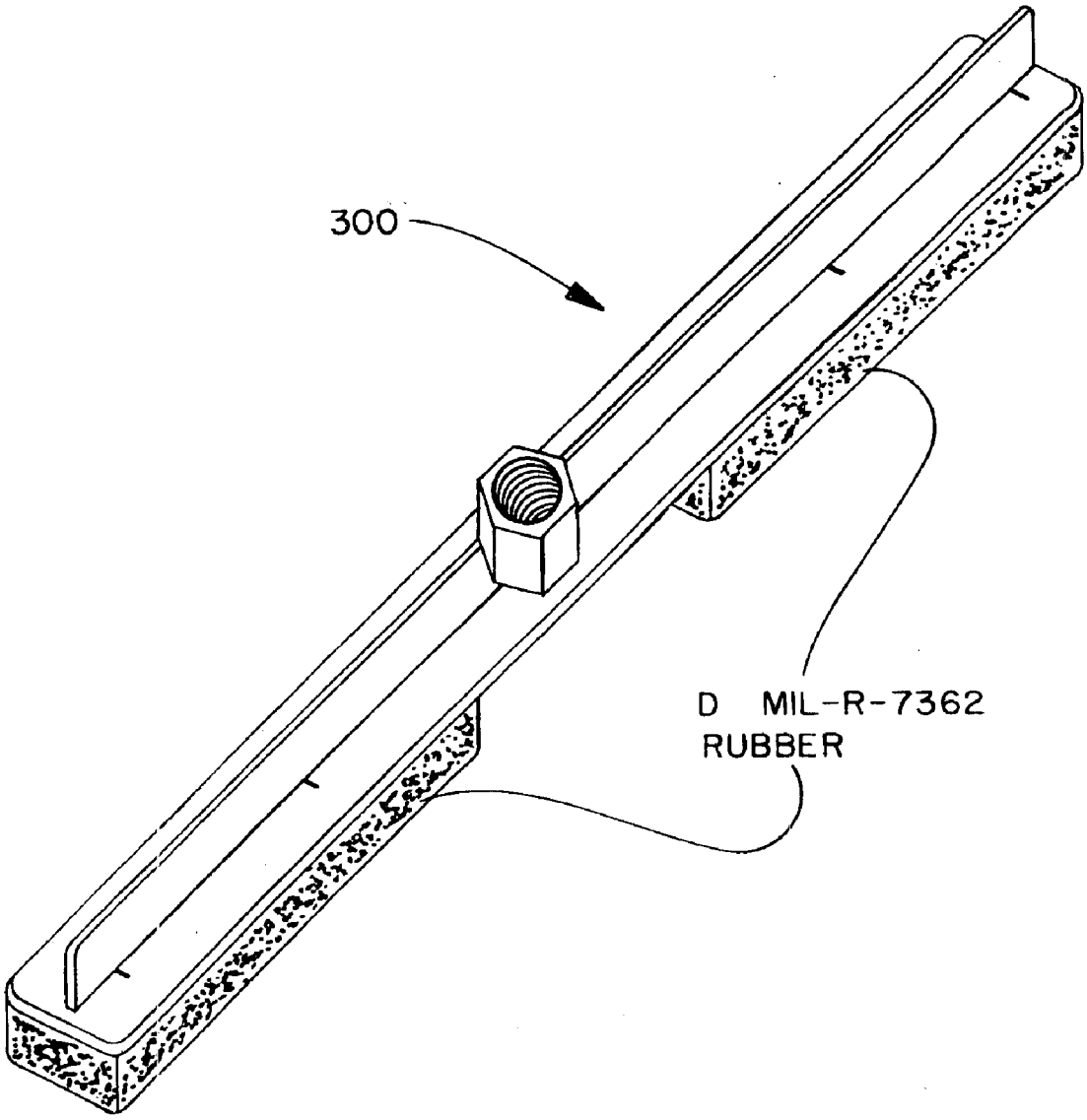

To understand the improvements of the present invention it is necessary to describe the current practice of aircraft tire service. FIGS. 1–3 are illustrations of the major elements of the aircraft wheel assembly fixture used in the present invention. This unit is designed to hold a wheel under uniform compression for installation of bolts during wheel-tire build-up. It will handle practically every wheel-tire assembly in current use up to 1400 pounds. It will serve as a bead breaker for wheels with up to and including 19-inch rim diameters.

In the process of the deflation, all aircraft tires must be completely deflated and the valve core removed before any attempts are made to dismount tires and disassemble the wheels. Failure to do so has resulted in fatal injury to personnel.

Another concern is that aircraft tires, tubes, and wheels can be damaged beyond repair by improper dismounting procedures and use of unauthorized tools. Tubeless tire bead sealing surfaces and the relatively soft aluminum and magnesium alloy wheels are easily damaged.

The present invention compresses aircraft evenly so that nuts may easily threaded onto bolts and O-ring will not be pinched, while utilizing one individual for a complete process.

The elements of FIG. 1 are:

a main frame 100 with a cap 160 and pivot point 151; an interior drive shaft 110 which has a threaded central surface 111 on its top and which goes down when the foot pedal 150 is depressed. The foot pedal 150 is held up by fixed springs 161 but drives downwards when the foot pedal is depressed.

FIG. 1 is an illustration of the main tire compression frame, upon which a tire is compressed. FIG. 2 shows the "tee" handle, which has a central threaded shaft that screw into the foot of FIG. 3 and the threaded cap of the inner drive shaft as follows.

When an aircraft tire is placed on the cap 160 of the frame 100 the "tee" of FIG. 2 and foot bar 300 of FIG. 3 act as described below.

The present invention is an aircraft tire compression system that is hand operated to evenly compress the tire from the wheel rim. The reader's attention is directed towards FIG. 2 which shows a threaded adaptor 250 in which a tee 250 drive down the foot bar 300 along a threaded axis 251, through the center of a wheel when the foot pedal 150 is pressed.

Figure 4:
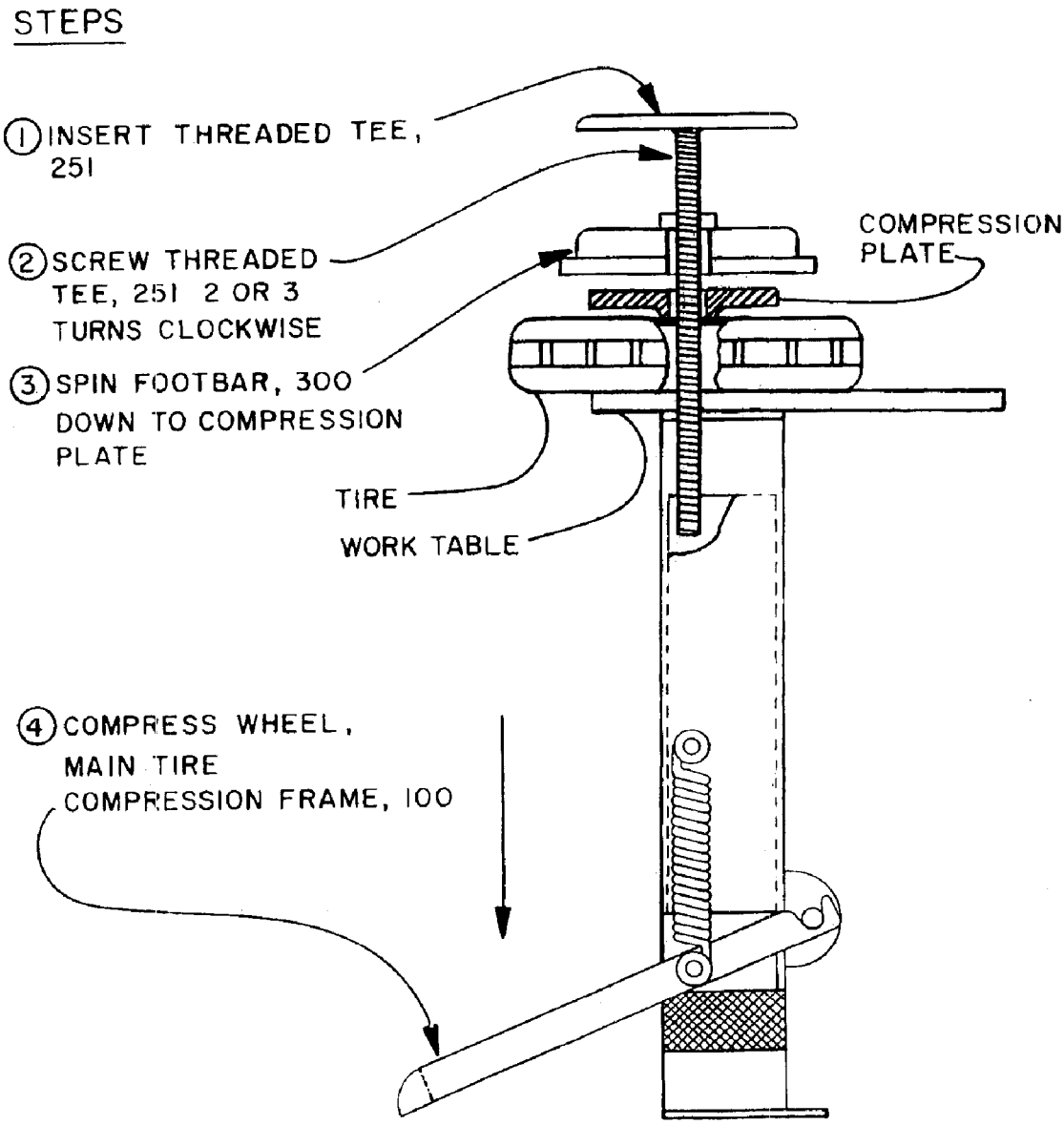
FIG. 4 illustrates the 4-step process of using the invention of FIGS. 1–3.

FIG. 2 illustrates the threaded shaft and fixed tee handle of the present invention Where the tee handle is about 6 inches and the threaded shaft 14 inches long. FIG. 3 is the wheel press foot bar 300 of the present invention to compress a tire. In FIG. 4 the threaded tee 251 is inserted through the compression plate into the central axle hole of a wheel to a threaded nut on the other side of the wheel. In FIG. 4 the threaded tee 251 and the wheel press foot bar 300 press plate 300 is spinned down to the compression plate 400. In FIG. 4 the wheel is uniformly compressed after the threaded tee 251 is turned by the mechanic and the foot bar is stepped on.

FIG. 4 adds another structural element not shown in FIGS. 1–3. More specifically, the tire is sandwiched between a pair of circular plates that have rims that fit over the rim of the tire and which uniformly squeeze the tire from the rim. These circular plates have a central aperture throw, which the shaft of the "tee" is inserted. The pair of plates used have a predetermined radius sized for the tire of interest and a projecting ½ inch rim that fits over the rim of the tire on each side of the tire rim.

FIG. 4 is a side view of the present invention and the process for using it is as described above. The invention is usually fixed to an adjacent workbench to ensure it remains upright as the foot pedal is stepped on.

Now, in order to understand the improvements the present invention offers, readers are reminded that at Edwards Air Force Base, part of the aircraft tire compression process currently used includes standing on the tire! The tire can be on a frame where someone is four feet above ground level, which presents a potential safety hazard from falls as well as inefficient tire compression.

While the invention has been described in its presently preferred embodiment it is understood that the words, which have been used, are words of description rather than words of limitation and that changes within the purview of the appended claims may be made without departing from the scope and spirit of the invention in its broader aspects.

What is claimed is:

1. A tire compressor system for squeezing a pneumatic tire from its rim and which comprises:

a main frame that has a cap upon which the pneumatic tire and rim are placed:

a drive shaft housed within the main frame, and which may be activated to move away from a cap o the main frame a pair of compression plates that have a central aperture and a diameter which approximately equals the rim of the pneumatic tire, the pair of compression plates fitting over the rim of the pneumatic tire so that it is sandwiched between the plates; and a means for fixing the pair of compression plates to the drive shaft so that they compress the pneumatic tire when the drive shaft is activated.

2. A tire compressor, as defined in claim 1, wherein said drive shaft has a top cap with a threaded aperture, and wherein said fixing means comprises:

a threaded shaft capped with a tee-shaped handle, said threaded shaft going through the pair of compression plates and the tire to screw into the threaded aperture of the top cap of the drive shaft; and a foot plate bar which has a threaded central aperture and which is screwed onto the threaded shaft above the compression plates to hold them tight to the mainframe and squeeze the pneumatic tire from the rim when the drive shaft is activated.

3. A tire compressor system for squeezing a pneumatic tire from its rim and which comprises:

a main frame which has a cap upon which the pneumatic tire and rim are placed:

a drive shaft housed within the main frame, and which may be activated to a move away from the cap of the main frame;

a pair of compression plates that have a central aperture and a diameter which approximately equals the rim of the pneumatic tire, the pair of compression plates fitting over the rim of the pneumatic tire so that it is sandwiched between the plates, wherein said drive shaft has a top cap with a threaded aperture;

a threaded shaft capped with a tee-shaped handle, said threaded shaft going through the pair of compression plates and the tire to screw into the threaded aperture of the top cap of the drive shaft; and a foot plate bar which has a threaded central aperture and which is screwed onto the threaded shaft above the compression plates to hold them tight to the main frame and squeeze the pneumatic tire from the rim when the drive shaft is activated; and a foot pedal which is pivotably attached to the main frame and which pulls the drive shaft down when activated.

* * * * *